US005481603A

United States Patent [19]
Gutierrez et al.

[11] Patent Number: 5,481,603
[45] Date of Patent: Jan. 2, 1996

[54] INTELLIGENT CALL PROCESSING BASED UPON COMPLETE IDENTIFICATION OF CALLING STATION

[75] Inventors: Franklin Gutierrez, Red Bank; Robert Y. Peters, Jr., Middletown; Aruna Thirunagari, Matawan; Joel K. Young, Middletown, all of N.J.

[73] Assignee: AT&T Corp., Murray Hill, N.J.

[21] Appl. No.: 127,864

[22] Filed: Sep. 28, 1993

[51] Int. Cl.⁶ .................................................. H04M 3/42
[52] U.S. Cl. .......................... 379/221; 379/229; 379/201; 379/127; 379/220
[58] Field of Search ..................................... 379/142, 220, 379/229, 240, 207, 201, 221, 127

[56] References Cited

U.S. PATENT DOCUMENTS

| | | | |
|---|---|---|---|
| 4,683,563 | 7/1987 | Rouse et al. | 370/16 |
| 4,752,924 | 6/1988 | Darnell et al. | 370/86 |
| 4,899,358 | 2/1990 | Blakley | 379/142 |
| 4,924,510 | 5/1990 | Le | 379/201 |
| 5,136,636 | 8/1992 | Wegrzynowicz | 379/207 |
| 5,163,087 | 11/1992 | Kaplan | 379/142 |
| 5,193,110 | 3/1993 | Jones et al. | 379/201 |
| 5,311,572 | 5/1994 | Friedes et al. | 379/201 |
| 5,333,184 | 7/1994 | Doherty et al. | 379/229 |

OTHER PUBLICATIONS

Newton's Telecom Dictionary by Harry Newton, 7th Ed., 1994, pp. 385–386.
D. M. Rouse et al. "The Number 2 Signal Transfer Point: An Overview of the AT&T Common Channel Signaling Packet Switch" New Communication Services: A Challenge to Computer Technology, Proceedings of the Eighth International Conference on Computer Communication, Munich, Sep. 1986, pp. 370–374.
R. B. Brown, Jr. et al. "Common Channel Signaling in the AT&T U.S. 5ESS Switch" Proceedings of the IEEE, vol. 80, No. 4, Apr. 1992, pp. 618–627.
G. Gary Schlanger, "An Overview of Signaling System No. 7", IEEE Journal on Selected Areas in Communications, vol. SAC-4, No. 3, May 1986, pp. 360–365.
K. E. Crawford et al. "The AT&T No. 2 Signal Transfer Point Design and Service Introduction in the AT&T Communications Common Channel Signaling Network" Globecom 1985, New Orleans, La., Dec. 1985.

Primary Examiner—Jeffery A. Hofsass
Assistant Examiner—Scott Wolinsky

[57] ABSTRACT

An intelligent call processing system is arranged so that each originating switch is provided with a local database called a "global title translation (GTT)" database, which receives a query fully identifying the calling station, typically in terms of its 10 digit number (i.e., three digit [NPA] area code, three digit [NXX] exchange, and four digit line identification). The GTT database responds to the query by identifying the particular NCP in the telecommunications network that contains the appropriate record for completing the call. If the GTT database does not contain an entry, or an error condition exists, a further query is launched to a centralized database, called a "universal global translation (UGT)" database. The UGT database then retrieves information identifying the particular NCP in the telecommunications network that contains the appropriate record for completing the call, and provides this information to the originating switch. The same information may also be provided to and stored in the GTT database, so that the GTT database is "self provisioning".

20 Claims, 4 Drawing Sheets

INTELLIGENT CALL PROCESSING BASED UPON COMPLETE IDENTIFICATION OF CALLING STATION

FIELD OF THE INVENTION

This invention relates generally to intelligent call processing, in which individual telephone calls are provided with different features depending upon characteristics of the call, including, particularly, the identity of the calling station, and, in particular, to such processing in which the entire identity of the calling station is used to ascertain the parameters and information for providing appropriate features to each call.

BACKGROUND OF THE INVENTION

Various intelligent call processing systems have been developed to provide customized features to users of telecommunications systems. Certain intelligent communications systems differentiate call treatment based upon the dialed or called number. For example, calls to an 800 subscriber are recognized in an originating switch, which then queries an associated database, called a network control point (NCP) and retrieves information specific to that subscriber. This enables each 800 subscriber to provide different routing or call treatment that best suits that subscriber. For example, one subscriber can use call time of day or day of week routing, another subscriber can use a different routing pattern, and a third subscriber can offer different service depending upon the traffic conditions at various call processing centers.

Other intelligent systems, including "virtual private network" or "software defined network" (SDN) systems, offer customized features suited to the calling party or the calling station. As an example of such systems, outbound calls from an executive of a subscriber may receive different treatment from calls originated by another employee. To provide the appropriate call treatment, information identifying the calling party and the calling station is today routed from an originating switch that receives a call, to a particular NCP which holds the call processing record (CPR) associated with the calling party. This routing requires that the caller's automatic number identification (ANI) information be mapped into a customer identifier and the network address of the NCP with the corresponding CPR. When the number of ANIs is small, this translation may be done using a minimum amount of information, usually the first three to six digits. However, as the number of subscribed ANIs increases studies have shown that, in some instances, the first NCP to receive the query does not have the correct record. In that event, the query must be rerouted to the correct NCP, via the SS7 signaling network which interconnects the NCP's. This undesirably adds to the post dial delay, specifically, to the time between the dialing of a call and the receipt in the originating switch of a response to a query for routing and handling instructions. Also, it increases the likelihood of a routing error, since the number of signaling messages that must be accurately transmitted through the SS7 network is correspondingly increased when an additional data base "dip" is needed; the extra dip also increases the cost of handling the call, since database capacity is a resource.

If the full 10 digits are used to determine the customer identifier and NCP holding the CPR, the translation becomes quite complex, requiring a 10 digit directory with the potential for millions of records. Historically, there have been two ways to solve the large directory problem for telecommunications services: (1) create a large, centralized directory for performing all translations or (2) distribute the ANI translations among all switches that handle incoming calls. Both techniques have significant shortcomings.

If a large, centralized directory is created, all calls coming into a network result in initiation of a query to a centralized directory for translation. The centralized directory makes provisioning simple, since all of the ANI translation information is sent to the same place, eliminating database synchronization problems. The difficulty is that the implementation adds post dial delay for each call, requires that the central directory have a large amount of processing power and places the central directory as a single point of failure for all calls.

If ANI translations are distributed among all incoming switches, translation information for a particular ANI resides in the switch which first receives the call. Since the information is distributed among as many as 100 or more switches, the delay impacts and processing power requirements are minimized, and a failure only affects calls coming into a particular switch. The difficulty with this implementation is in the provisioning of the data among all of the switches. In order to accurately distribute the translation data, a complex ANI-to-Switch translation directory and database synchronization mechanisms are needed.

SUMMARY OF THE INVENTION

In accordance with the present invention, an originating switch is arranged to provide intelligent call processing using a local database called a "global title translation (GTT)" database. When the switch receives a call, such as an SDN call or an 800 call that requires intelligent call processing, the switch routes a query fully identifying the calling station, typically in terms of its 10 digit number (i.e., three digit [NPA] area code, three digit [NXX] exchange, and four digit line identification), to the GTT database. The GTT database responds to the query by identifying the customer ID and the particular NCP in the telecommunications network that contains the appropriate record for completing the call. If the GTT database does not contain an entry, or an error condition exists, a further query is launched to a centralized database, called a "universal global translation (UGT)" database. The UGT database then retrieves information identifying the customer ID and the particular NCP in the telecommunications network that contains the appropriate record for completing the call, and provides this information to the originating switch. In accordance with an aspect of the invention, the same information is also provided to and stored in the GTT database. Thus, the GTT database is "self provisioning", in that it will thereafter contain the appropriate information to avoid another query to the UGT database when a call is subsequently originated from the same calling station.

By virtue of the arrangement of the present invention, NCP to NCP queries are avoided: if the GTT database has the requisite information, one query is routed directly to the appropriate NCP. If the GTT database does not have the requisite information, a query to the UGT database is necessary, but this enables routing to the correct NCP directly from the originating switch. This arrangement in turn makes more efficient use of the signaling network and reduces post dial delay.

In addition, the invention leverages off the advantages of both the centralized and distributed implementations, while avoiding their respective pitfalls.

BRIEF DESCRIPTION OF THE DRAWINGS

The present invention will be more fully understood by reference to the following detailed description, which should be read in light of the accompanying drawings in which.

DETAILED DESCRIPTION

Figure 1:
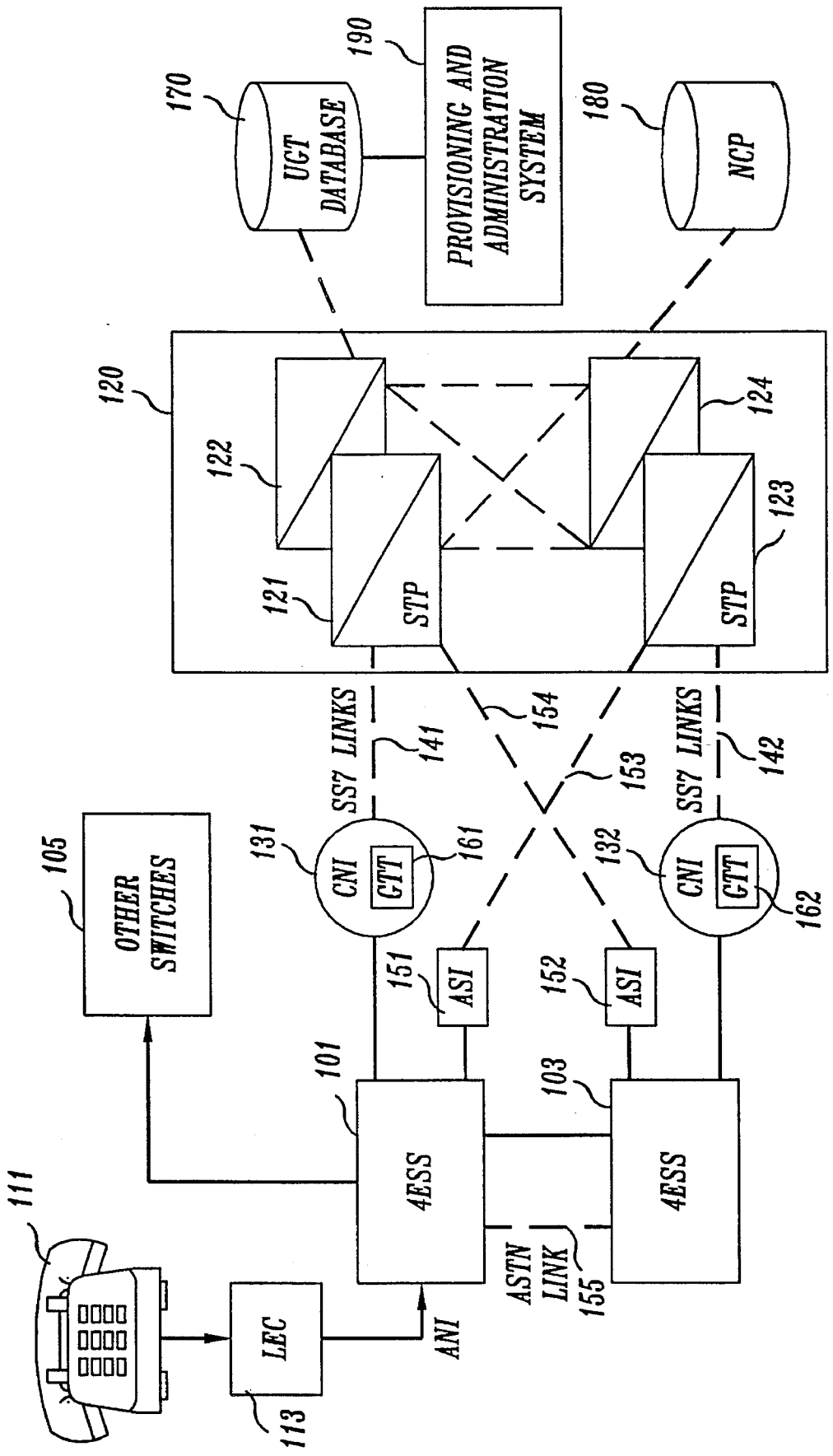
FIG. 1 is a block diagram illustrating the interrelationship between an originating switch, its GTT database, and the UGT database.

Referring first to FIG. 1, there is shown a block diagram illustrating the interrelationship between an originating switch, its associated GTT database, and the UGT database, in accordance with the present invention. To provide perspective, FIG. 1 also illustrates the interconnections between these elements and certain other elements in the telecommunications switching and signaling system of a telecommunications carrier.

Switches 101 and 103, which may be 4ESS electronic switching systems available from AT&T, are interconnected with each other and with other switches designated generally at 105 to form a telecommunications network for routing calls originating illustratively from a subscriber station 111. In FIG. 1, subscriber station 111 is connected to and said to be "homed on" a particular switch, in this case, switch 101; the connection is via a local exchange carrier (LEC) network, indicated generally at 113, which provides automatic number identification (ANI) information to switch 101 in accordance with well known capabilities. This ANI information is indicative of the calling station at which a call is originated.

Switches 101 and 103, and, indeed, all of the other switches 105, are interconnected with signal transfer points (STP) that are included within a signaling network designated generally as 120. The STP's are arranged in pairs, and each switch is connected directly to one STP pair. The connection between each switch and its STP pair is made through an interface that may be a so called "CNI ring". Specifically, switch 101 is connected to STP pair 121,122 through CNI ring 131, and switch 103 is connected to STP pair 123,124 through CNI ring 132. The connections between the switches (or, more precisely, the CNI rings) and the STP's are made via signaling system 7 (SS7) signaling links, such as signaling links 141 and 142 in FIG. 1, which are shown dotted, to distinguish signaling links carrying signaling messages from the circuits that carry communications, which are shown as solid lines. As is well known, the SS7 signaling network is essentially a digital packet network, the arrangement of which is well known to those skilled in the art. See, for example, an article entitled "Common Channel Signalling in the AT&T 5ESS Switch" by R. Brown et al., Proceedings of the IEEE, Vol. 80, No. 4, p 618–627, 1992, an article entitled "The Number 2 Signal Transfer Point: An Overview of the AT&T Common Channel Signaling Packet Switch, D. Rouse et al., New Communication Services: A Challenge to Computer Technology, Proceedings of the Eighth International Conference on Computer Communication, Munich, F.R.G., September 1986 pp. 370–374, and an article entitled "An Overview of Signalling System No. 7" by G. Schlanger, IEEE Journal on Selected Areas in Communications, Vol. SAC-4, No. 3, p 360–365, 1986. Note that the individual STP's 121–124 are also interconnected with each other via signaling links. CNI rings are described in U.S. Pat. No. 4,752,924 issued on Jun. 21, 1988 to J. W. Darnell et al.

FIG. 1 illustrates that a network control point (NCP) 180 is connected to STP pair 123,124, and that, in accordance with the invention, a universal global translation (UGT) database 170, described in more detail below, is connected to STP pair 121,122. In an actual arrangement, multiple NCP's, not shown, are interconnected with the STP's in signaling network 120, such that any STP may query any NCP either by a direct connection to the NCP via one signaling link, or an indirect connection to the NCP using other STP's and multiple signaling links. Each NCP is a database containing call processing records which identify how a call should be treated and routed, based upon information supplied to the NCP in the form of a query. Illustratively, the query can identify the calling station or the originating location based upon ANI information. The UGT database 170 contains records that include the global title translation tables stored in the global translation table (GTY) database associated with each switch, as are discussed in more detail below.

As indicated above, FIG. 1 also illustrates that switches 101 and 103 are interconnected with the signaling network 120 and with each other via certain signaling paths, in addition to those involving the CNI ring, for the purpose of backup and disaster recovery. Specifically, switches 101 and 103 each have an associated alternate signaling interface (ASI) 151 and 152, respectively, which provides a connection via a signaling link to an STP pair different from the STP pair that is connected to the same switch via the CNI ring 131 or 132. Thus, switch 101 is connected to STP pair 123,124 through ASI 151, and switch 103 is connected to STP pair 121,122 through ASI 152. In addition, switches 101 and 103 are directly connected to each other through an alternate signaling transport network (ASTN) signaling link 155.

As indicated above, in accordance with the present invention, a global title translation (GTT) database is associated with each switch, such as switches 101 and 103. The GTT database is shown in FIG. 1 as being positioned within CNI ring 131 and connected to switch 101, while GTT database 162 is shown as being positioned within CNI ring 132 and connected to switch 103. The information in each GTT database 161,162 translates ANI information for each call origination handled by the switch to the "point code" which identifies the appropriate NCP that contains the customer call processing record (CPR) needed to complete the routing and processing of the call. The translation also provides the subsystem number (SSN) which identifies the application within the NCP and Customer ID which identifies the CPR within the identified application. The information in each GTT database is unique, such that the GTT associated with each switch contains records for the calling lines (ANIs) homed on that particular switch. (As discussed below, certain additional records may also be included, so that the records stored in each GTT database are "overlapping" and not entirely unique.) Thus, the records at a particular switch are different from the set of records kept at the other switches. This is necessitated by the large number of records required to be kept if "translations" are based on the entire (10 digit) number of the calling station. Other interconnection arrangements for the GTT may also be possible, and those are discussed in more detail below. Thus, it may be said that, in accordance with the present invention, a GTT database is associated with each switch.

Figure 2:
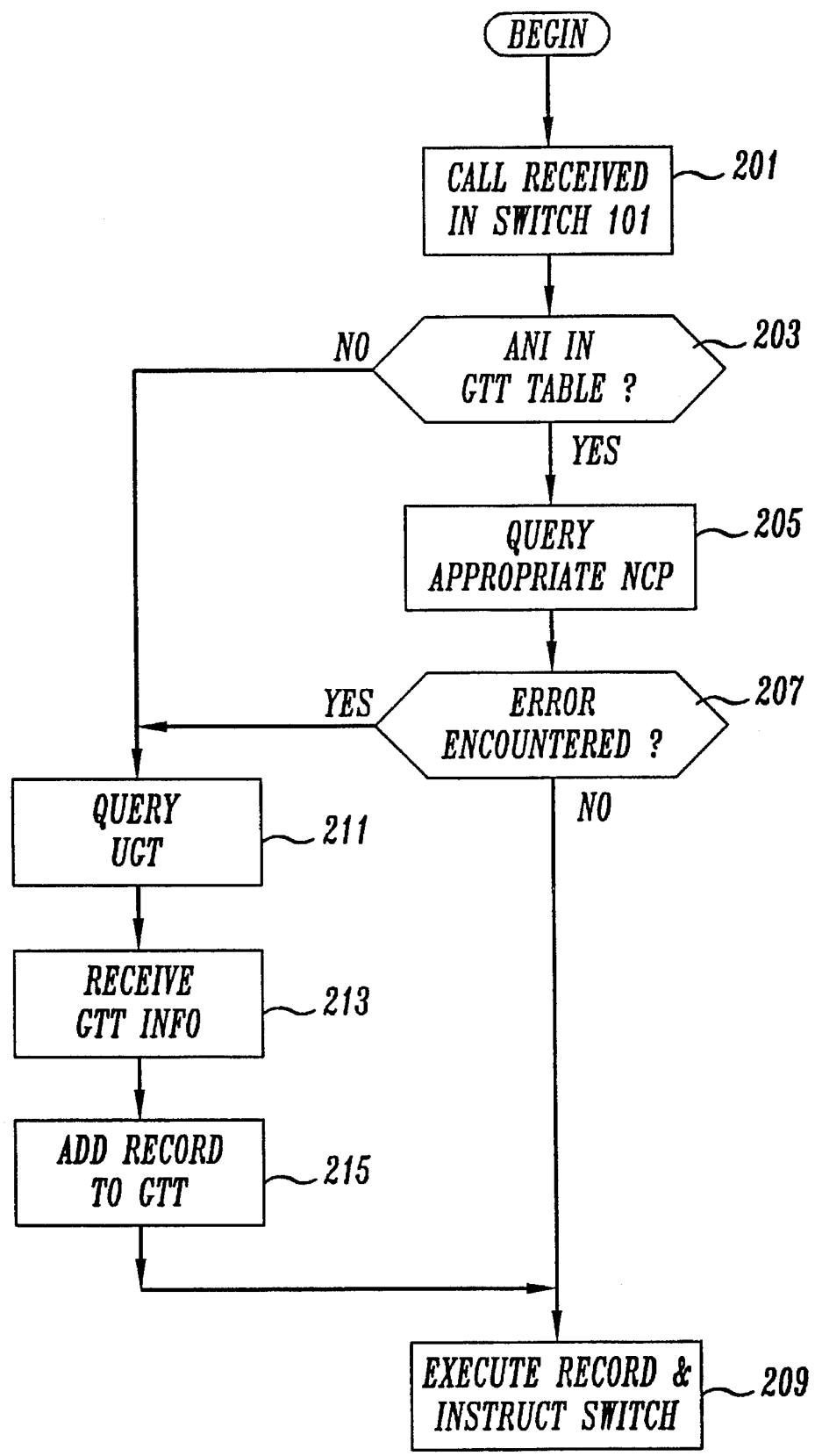
FIG. 2 is a flow diagram illustrating the sequence of steps followed in determining call treatment for a call received in originating switch 101 of FIG. 1.

Referring now to FIG. 2, there is shown a flow diagram illustrating the process followed when a call originated from subscriber station 111 is received in switch 101. The process is triggered in switch 101 in step 201, by the receipt of a call, which may be an ordinary long distance call, a call to an 800 number, or an SDN call. It is assumed that the call origination information includes ANI information identifying subscriber station 111 as the source of the call. Next, in step 203, GTT database 161 associated with switch 101 is checked to determine if there is an entry (record) stored for that particular ANI. If an entry is found, the record contains the identity, typically in the form of a "point code" or address, for the particular NCP (possibly NCP 180) which contains the call processing record for the call, as well as the subsystem number and customer ID which are needed to process the call. In response to the identification, a query is routed to the appropriate NCP in step 205, and, if no error is encountered in step 207, the CPR is executed and the retrieved routing and call handling instructions are returned to switch 101 in step 209. In accordance with our invention, if an entry cannot be found in step 203, or if an error condition is encountered in step 207, a query is launched in step 211, from switch 101 via signaling network 120, to UGT database 170, to obtain the information that "should" have been in GTT database 161 in the first place. This information is retrieved in step 213 and, in accordance with an aspect of the invention, returned to and inserted in GTT database 161 in step 215. Thus, the records in GTT database 161 (and the other GTT's in the system) are automatically updated, and the system is said to be "self provisioning." After the record is added to GTT database 161, the process is completed as if the record had been found: the CPR is executed and the switch is instructed on call treatment and completion in step 209.

As stated previously, other interconnection arrangements for the GTT are within the contemplation of the present invention. Specifically, the GTT may include, but not be limited to, interconnection arrangements between the GTT and main processor of the switch, between the GTT and the switch signaling interface, or between the GTT and an adjunct.

Figure 3:
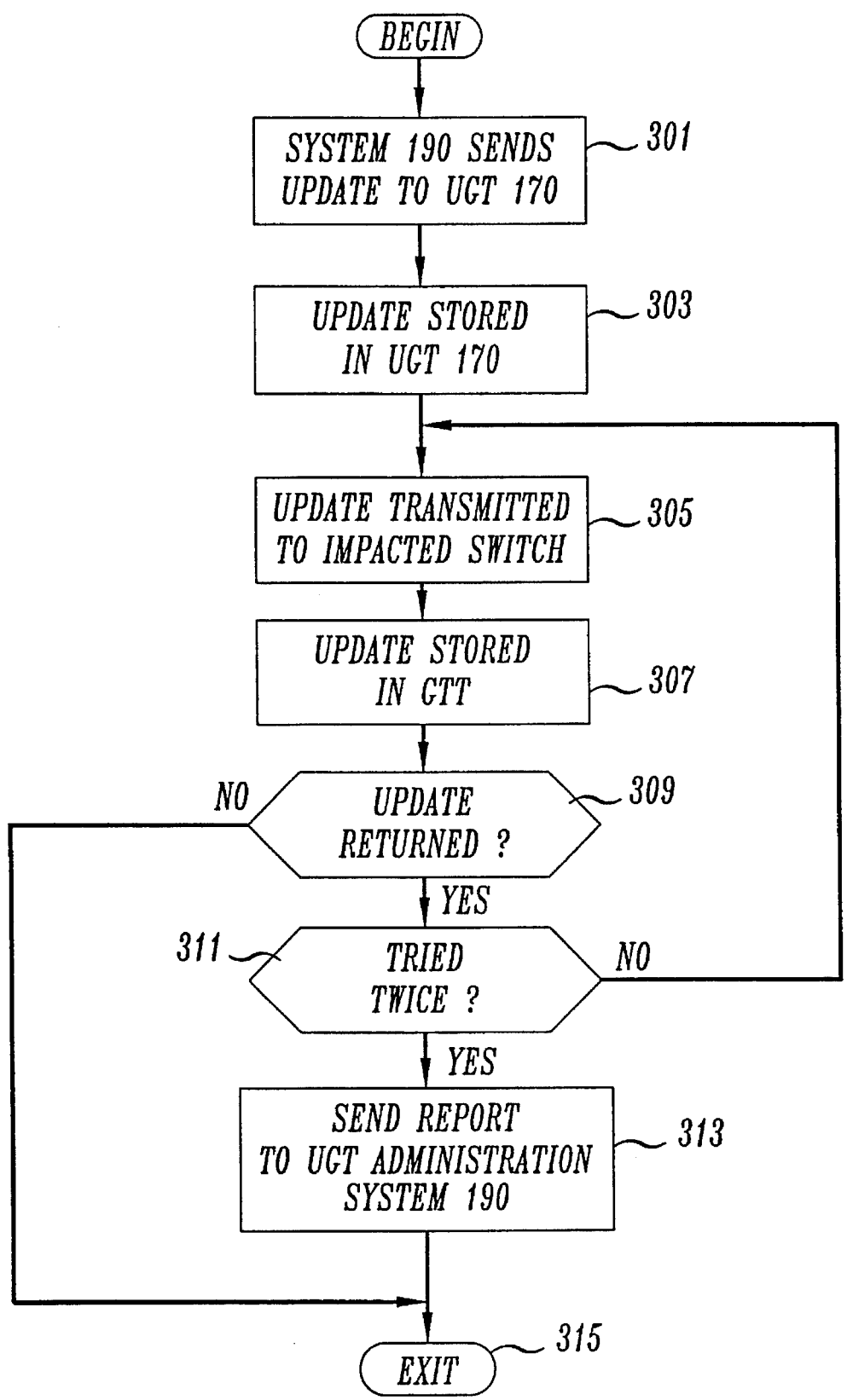
FIG. 3 is a flow diagram illustrating the sequence of steps followed in provisioning (storing information in) UGT database 170 of FIG. 1, and in updating such information.

Referring now to FIG. 3, there is shown a flow diagram illustrating the sequence of steps followed in provisioning (storing information in) UGT database 170 of FIG. 1, and in updating such information. This process uses an element shown in FIG. 1 not previously described, namely provisioning and administration system 190, which consists of a microprocessor and a database. The process followed in FIG. 3 begins in step 301, when provisioning and administration system 190 sends an update to UGT database 170. This step may be performed periodically, for example, once a day, or intermittently, when a predetermined volume of change information has been accumulated in provisioning and administration system 190. The information sent to UGT database 170 typically includes (a) the identity of the ANI being updated, and (b) the details of the change, which can be an addition, a deletion, or a change of information. Upon receipt of the information transmitted in step 301, UGT database 170 stores the information in step 303; also, UGT database 170 notifies the impacted switch, for example, switch 101, in step 305, that an update transaction is being performed. Responsive to the notification in step 305, switch 101 attempts to perform a corresponding update in GTT database 161, in step 307. If it is determined in step 309 that the update is returned because it has not been or cannot be made, and if it is determined in step 311 that two attempts have not yet occurred, the update process is repeated by returning to and repeating step 305. After two unsuccessful update attempts have been made, a notification is sent to UGT database 170 in step 313, so that an exception may be reported to and stored in provisioning and administration system 190 in step 315. If the update is successfully made and a positive result occurs in step 309, the process of FIG. 3 is terminated in step 315.

Figures 4, 5:
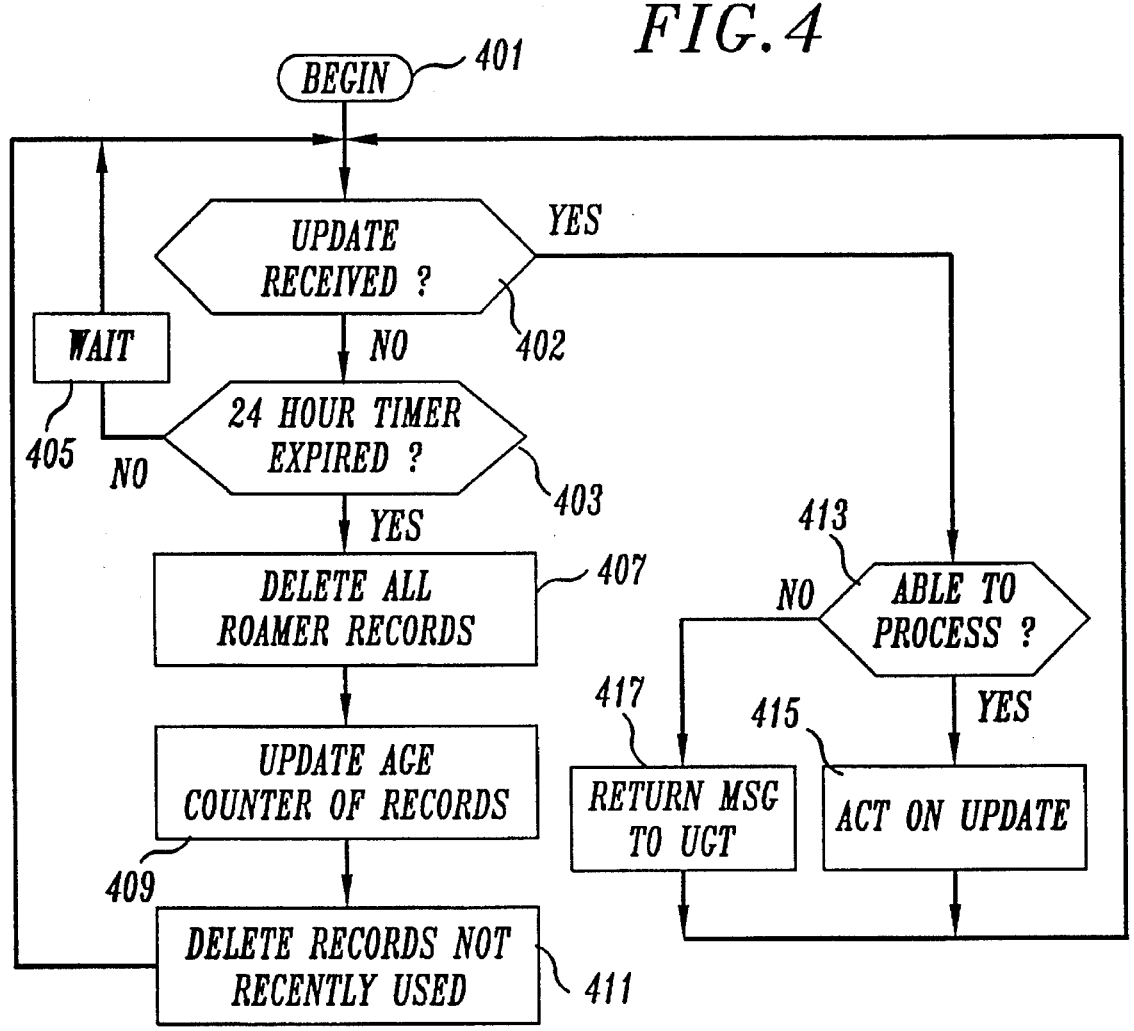
FIG. 4 is a flow diagram illustrating the sequence of steps followed in managing the information stored in GTT database 161 or 162 of FIG. 1.
FIG. 5 illustrates the format of the records stored in UGT database 170.

Referring now to FIG. 4, there is shown a flow diagram illustrating the sequence of steps followed in managing the information stored in GTT database 161 or 162 of FIG. 1. After the process begins in step 401, a determination is made in step 402 as to whether an update has been received from UGT database 170. If not, routine maintenance may be required, and a test is made in step 403 to see if a predetermined time, illustratively 24 hours, has elapsed since the last maintenance activity. If a positive result is obtained in step 403, the process performs steps 407, 409 and 411; otherwise, the system "waits" in step 405, and then returns to steps 402 35 and 405 for subsequent updates or routine maintenance.

If a positive result occurs in step 403, then records for roamers are deleted in step 407. This is done because these records tend to be transient in nature, and thus storage in the GTT database is not generally required on a long term basis. Next, in step 407, the age of each other entry in the GTY database (other than those entries determined to pertain to roamers) is updated in step 409. If a particular entry is determined to be older than a predetermined age, the entry is then removed in step 411. Note here that the same treatment afforded to roamer records may also be used with respect to records pertaining to software defined network (SDN) remote access calls, i.e., calls originated by SDN users from off-network locations. In addition, if the database is full, the least used records may be deleted in step 411, notwithstanding that the age of the entry has not exceeded the predetermined value.

If a positive result is obtained in step 402, indicating that an update is to be processed, then a determination is made in step 413 as to whether the update can be successfully stored in GTT database 161 or 162. If a positive result is obtained, the update is actually stored in step 415, and the process of FIG. 4 is repeated; if a negative result is obtained in step 413, then an appropriate error message is transmitted to UGT database 170 in step 417, and again the process of FIG. 4 is repeated.

Various processes are available with the arrangement of FIG. 1, in the event of a failure of some of the network elements. Specifically, if there is a failure in a CNI ring 131 at switch 101, that switch will rely on the ASTN link 155 to query UGT database 170 and or NCP 180. This changes the call flow from that described above. Under these circumstances, the call flow is as follows:

Assume that switch 101 is the "victim" switch and that switch 103 is the "helper" switch. In this instance, switch 101 will not be able to check its GTT database 161 and will instead launch a query to UGT database 170 via "helper" switch 103. GTT database 162 is not checked, because that database would not be expected to contain the needed record. Hence, when ASTN is invoked due to an outage at the "victim" switch, all calls from that switch will query UGT database 170.

The format of a typical record stored in UGT database 170 is illustrated in FIG. 5. As shown, each record uses the 10 digit telephone number in the format NPA-NXX-XXXX, as the storage and retrieval key. Each record includes a customer ID in field 502, which is used for administration purposes. Primary and backup NCP point codes (addresses)

are stored in fields 503 and 505, respectively, and represent the identity of the particular NCP that contains a record for a call originated from a station with the specified 10 digit number. Primary and backup NCP subsystem numbers (SSNs) are stored in fields 504 and 506, respectively, and also indicate the routing to the appropriate NCP. Finally, in field 507, the date when the record was last updated is stored.

Various modifications may be made to the present invention by those skilled in the art. Thus, it is intended that the invention be limited only by the appended claims.

We claim:

1. Apparatus for intelligent processing of telephone calls, said apparatus including:
   an originating switch arranged to route a received telephone call in accordance with a call processing record associated with a station from which said received telephone call was originated;
   a local database containing a first set of information indicating locations of a plurality of telecommunications network databases that contain call processing records for completing received telephone calls;
   means responsive to receipt of said received telephone call and information identifying said station from which said received telephone call was originated, for routing a query to said local database to retrieve the location of a particular one of said telecommunications network databases that contains said call processing record for completing said received telephone call; and
   means responsive to an indication that said local database does not contain said information indicating the location of a particular one of said telecommunications network databases that contains said call processing record for completing said received telephone call, for routing a query to a centralized database containing a second set of information indicating the locations of said particular one of said telecommunications network databases that contains said call processing record for completing said received telephone call.

2. The apparatus as defined in claim 1 further including means for updating the information in said local database with information retrieved from said centralized database.

3. The apparatus as defined in claim 1 further including:
   means for obtaining a call processing record from said particular one of said telecommunications network databases indicated in response to a query to said local database or said centralized database; and
   means for executing said call processing record obtained from said particular one of said telecommunications network databases to obtain routing information for said switch.

4. The apparatus as defined in claim 1 wherein at least one of said telecommunications network databases is a network control point.

5. The apparatus as defined in claim 1 wherein said information identifying said station from which said received telephone call was originated is obtained from automatic number identification (ANI) information.

6. The apparatus as defined in claim 5 wherein said ANI information includes a telephone number of said station in a format NPA-NXX-XXXX, where NPA represents a numbering plan area of said station, N is a digit 1–9, and X is a digit 0–9.

7. A system for intelligent processing of telephone calls in accordance with prestored instructions associated with a station from which the telephone calls are originated, said system comprising:
   a local database and a centralized database, each containing information indicating locations of a plurality of telecommunications network databases that contain call processing records for completing telephone calls;
   means responsive to receipt of a telephone call and information identifying a particular station from which said received telephone call was originated, for routing a query to said local database to retrieve the location of a particular one of said plurality of telecommunications network databases that contains a call processing record for completing said received telephone call; and
   means for routing a query to said centralized database to retrieve said location of a particular one of said plurality of telecommunications network databases that contains said call processing record for completing said received telephone call only if said local database does not contain an entry associated with said particular station.

8. The System as defined in claim 7, further including means for updating said local database with information obtained from said centralized database.

9. The system as defined in claim 7, further including means for periodically deleting information stored in said local database.

10. The system as defined in claim 7, wherein said information identifying a particular station from which said received telephone call was originated includes automatic number identification (ANI) information.

11. A telephone network arrangement including:
    a global title translation (GTI) database;
    a network switch;
    means in said network switch arranged, in response to receipt of a call that requires intelligent call processing, to route a first query fully identifying the calling station from which said call was originated, to said GTT database;
    means in said GTT database for storing information identifying a particular network control point (NCP) in the telecommunications network that contains a call processing record for completing said received call and for providing said information to said network switch in response to said first query;
    a centralized universal global translation (UGT) database;
    means in said network switch arranged to route a second query to said UGT database if said GTT database does not respond to said first query; and
    means in said UGT database for storing information identifying a particular NCP in the telecommunications network that contains a call processing record for completing said received call and for providing said information to said network switch in response to said second query.

12. The telephone network arrangement as defined in claim 11 further including means for updating information in said GTT database with information obtained from said UGT database in response to the second query.

13. The telephone network arrangement as defined in claim 11, wherein said first and second queries each include a 10 digit telephone number for identifying the calling telephone station.

14. A method for intelligent processing of telephone calls in accordance with prestored instructions associated with a station from which said telephone calls are originated, said method including the steps of:

storing information indicating locations of a plurality of telecommunications network databases that contain call processing records for completing telephone calls in a local database and a centralized database;

responsive to receipt of a telephone call and information identifying a particular station from which said received telephone call was originated, routing a query to said local database to retrieve the location of a particular one of the plurality of telecommunications network databases that contains a call processing record for completing said received telephone call; and routing a query to said centralized database to retrieve said location of a particular one of said plurality of telecommunications network databases that contains said call processing record for completing said received telephone call only if said local database does not contain an entry associated with said particular station.

15. The method as defined in claim 14 further including a step of updating the local database with information obtained from the centralized database.

16. The method as defined in claim 14 further including a step of periodically deleting information stored in said local database.

17. The method as defined in claim 14, wherein said information identifying a particular station from which said telephone call was originated includes automatic number identification (ANI) information.

18. A method for routing calls through a telephone network including the steps of:

storing information identifying a particular network control point (NCP) database in said telephone network that contains a call processing record for completing calls in a first global title translation (GTI) database and in a second universal global translation (UGT) database;

responsive to receipt of a call that requires intelligent call processing, routing a first query fully identifying a calling station from which said received call was originated, to said first GTT database and providing information obtained in response to said first query to a switch in said telephone network; and routing a second query to said UGT database if said GTT database does not respond to said first query, and providing information obtained in response to said second query to said switch.

19. The method defined in claim 18, further including a step of updating information in said first GTT database with information obtained from said second UGT database in response to said second query.

20. The method defined in claim 18, wherein the first and second queries each include a 10 digit telephone number for identifying the calling station.

* * * * *